W. C. EICKMAN.
LAWN SPRINKLING DEVICE.
APPLICATION FILED FEB. 12, 1912.
1,100,963.
Patented June 23, 1914.
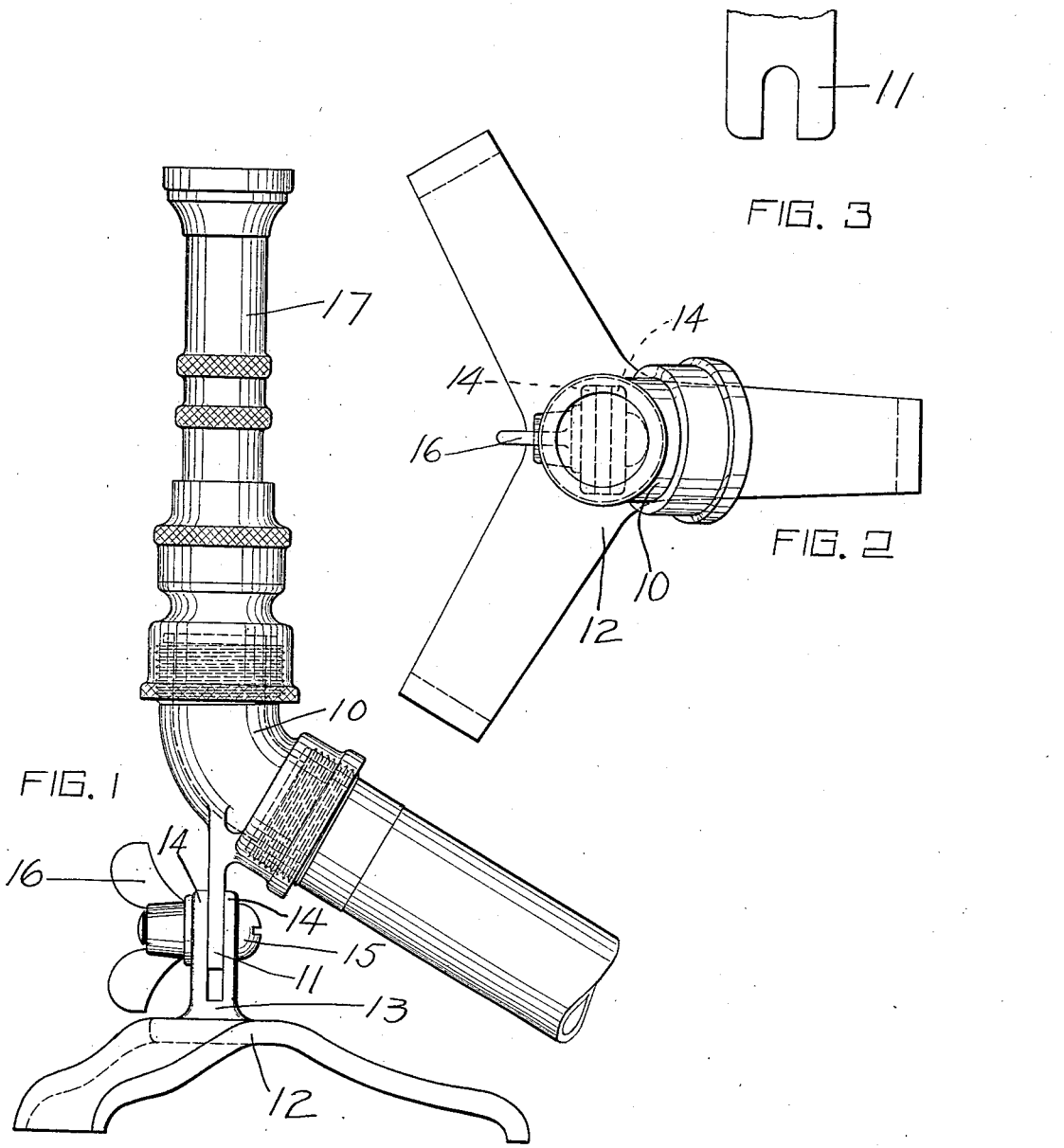

UNITED STATES PATENT OFFICE.

WALTER C. EICKMAN, OF DAYTON, OHIO.

LAWN-SPRINKLING DEVICE.

1,100,963.  Specification of Letters Patent.  Patented June 23, 1914.

Application filed February 12, 1912. Serial No. 677,079.

*To all whom it may concern:*

Be it known that I, WALTER C. EICKMAN, a citizen of the United States, residing at Dayton, in the county of Montgomery and State of Ohio, have invented a new and useful Improvement in Lawn-Sprinkling Devices, of which the following is a specification.

My invention relates to lawn sprinkling devices and has for its object to provide an attachment whereby with an ordinary hose and its nozzle an effective lawn fountain may be produced.

By the use of my attachment the water may be directed vertically upward or at any desired angle. As the modern nozzle is usually constructed so that it may be adjusted to throw anything from a fine spray to a solid stream, my attachment affords means for producing a fountain having all the range of variation the nozzle is capable of.

In the accompanying drawings Figure 1 shows my attachment with the hose and nozzle attached; Fig. 2 is a plan of the attachment without the hose or nozzle; and Fig. 3 is a detail of construction.

Similar numerals indicate similar parts throughout the several views.

The attachment consists primarily of a tubular member 10, preferably curved as shown, provided at one end with a thread complementary to the thread of the coupling on which the nozzle ordinarily screws, and having at the other end a thread complementary to the thread of the nozzle. A lug 11 is formed on the member 10, preferably in alinement with the axis of the nozzle receiving end of the member.

A tripod 12 is provided with an upwardly extending clamp 13, comprising parallel jaws 14—14, a bolt 15 and thumb-nut 16. The lug 11, which is bifurcated so it can straddle the bolt 15 is clamped between the jaws 14—14, and, as is obvious, it may be rotated therein and the nozzle 17 directed toward any point on an arc of 180 degrees or more. Tightening the thumb-nut will hold the member 10 in the desired position. The member 10 may be detached from the tripod if desired and, without removing the member from the hose, the hose may be used in the ordinary manner. When so used the angular position of the nozzle facilitates reaching around plants and shrubs to water their roots, while it does not impair the usefulness of the hose for most ordinary purposes.

Having described the preferred embodiment of my invention and explained its uses, I claim:

In a lawn sprinkling device, the combination of a tubular member adapted to be interposed between a hose and its nozzle, said member having a thread at one end complementary to the thread of the hose coupling, a thread at the other end complementary to the thread of the nozzle, and a bifurcated lug in substantial alinement with the axis of the nozzle receiving end; a base adapted to rest upon the lawn, having a clamp to receive the aforesaid lug, a bolt with a thumb nut to tighten the clamp, the bolt being straddled by the lug, the lug and clamp being so constructed that the tubular member may be rotated with the bolt as its axis and the nozzle directed toward any point on an arc of 180 degrees.

WALTER C. EICKMAN.

Witnesses:
F. K. FASSETT,
A. T. WORHNAM.

Copies of this patent may be obtained for five cents each, by addressing the "Commissioner of Patents, Washington, D. C."